Oct. 2, 1928.

A. W. THOMPSON

GRAVE COVER

Filed Sept. 1, 1927

1,686,048

Inventor

A. W. Thompson,

By Clarence A. O'Brien
Attorney

Patented Oct. 2, 1928.

1,686,048

UNITED STATES PATENT OFFICE.

ANTHONY W. THOMPSON, OF CALIFORNIA, MISSOURI.

GRAVE COVER.

Application filed September 1, 1927. Serial No. 216,986.

This invention relates to covers for graves, and has for an object to provide an article of this character of an attractive appearance, and at the same time serving as a protection for the grave, under all weather conditions, and also embodying a protecting shield entirely surrounding the grave opening, beneath the surface of the ground, whereby to prevent mice and other animals from working under the cover into the grave.

A further object is to provide an article of this character which is simple and practical in construction, strong and durable, adapted to be easily and quickly arranged in position, inexpensive to manufacture, and otherwise well adapted for the purposes for which the same is intended.

Other objects and advantages of the invention will become apparent from the following drawing and description:—

In the accompanying drawings forming part of this application:—

Figure 1:
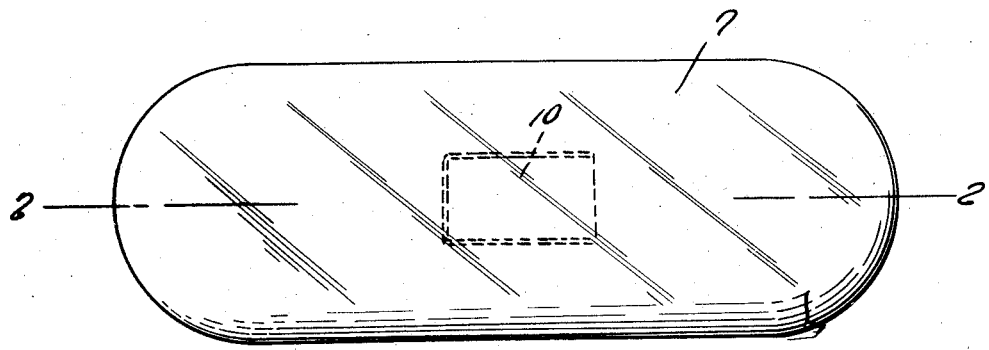
Figure 1 is a top plan view.
Figure 2:
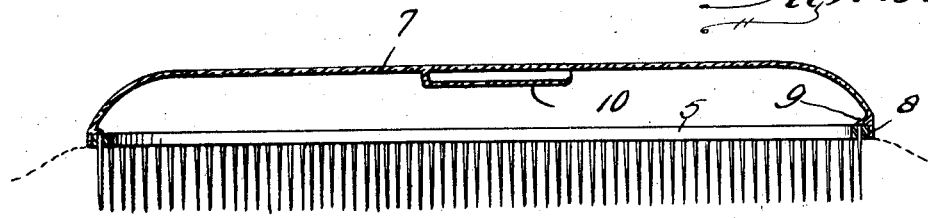
Fig. 2 is a longitudinal sectional view taken along a line 2—2 of Fig. 1.
Figure 3:
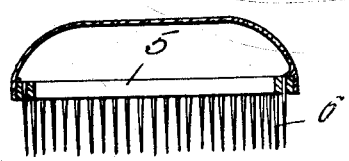
Fig. 3 is a transverse sectional view thereof.

Referring now to the drawings in detail, I provide an oval-shaped band 5, which may be constructed of wood or other suitable material and provided with a plurality of spikes 6 extending from the bottom side thereof, said spikes being of sufficient length to enable the same to penetrate the ground about the opening of a grave to a considerable extent and arranged in closely spaced parallel relation as indicated in Figs. 2 and 3, whereby to prevent mice and similar small animals from entering the grave between the spikes.

A cover 7 is provided which is preferably constructed of sheet glass and of a convex formation, whereby to enable the edges of the cover to rest upon the band 5, the central portion of the cover in spaced relation above the ring, substantially in the form of a mound as indicated in Fig. 2.

The cover 7 is also of an oval formation with its lower edge 8 of a suitable equal circumference to enable the same to fit snugly over the outer edge of the ring 5, the inner wall of the cover adjacent the edge thereof being provided with a valve 9 for resting upon the upper edge of the ring 5, thus forming a support for the same.

The under side of the central portion of the cover is provided with a pocket 10, which may be used for the purpose of placing pictures or photographs of the deceased or other ornamentations therein.

It will be apparent from the foregoing that upon placing the device in position over the opening of a grave, that the same will serve to protect the same from the destruction of the contents of the grave by mice or other animals, as well as from weather, and at the same time to constitute an attractive marker or cover for the same.

It is obvious that the invention is susceptible to various changes and modifications, without departing from the spirit or scope of the invention as hereinafter claimed, and I accordingly claim all such forms of the device to which I am entitled.

Having thus described my invention, what I claim as new is:—

1. A device of the class described comprising a cover having a plurality of spikes extending vertically from one side thereof in closely spaced relation and adapted to penetrate the ground at the edges of the cover, whereby to form a barrier against the entrance of animals to the area beneath the cover.

2. In a grave cover, a ring member conforming with the contour thereof, a plurality of spikes extending downwardly from the ring in closely spaced parallel relation forming a barrier against the passage of animals between said spikes to the under side of the cover, said cover being concaved with its edges disposed downwardly and adapted for supporting upon said ring member.

In testimony whereof I affix my signature.

ANTHONY W. THOMPSON.